July 5, 1949. D. M. CLARK ET AL 2,475,479
GARMENT OR ATTACHMENT FOR CONTROLLING THE DISTRIBUTION,
PRESSURE AND CIRCULATION OF BODY FLUIDS
Filed Sept. 26, 1946 3 Sheets-Sheet 1

INVENTORS
DAVID M. CLARK
EARL H. WOOD
HENRY A. SCHROEDER
BY
ATTORNEY

July 5, 1949.  D. M. CLARK ET AL  2,475,479
GARMENT OR ATTACHMENT FOR CONTROLLING THE DISTRIBUTION,
PRESSURE AND CIRCULATION OF BODY FLUIDS
Filed Sept. 26, 1946  3 Sheets-Sheet 2

INVENTORS:
DAVID M. CLARK
EARL H. WOOD
HENRY A. SCHROEDER
BY Chester A. Williams
ATTORNEY July 5, 1949.　　　　D. M. CLARK ET AL　　　　2,475,479
GARMENT OR ATTACHMENT FOR CONTROLLING THE DISTRIBUTION,
PRESSURE AND CIRCULATION OF BODY FLUIDS
Filed Sept. 26, 1946　　　　　　　　　　　　　3 Sheets-Sheet 3
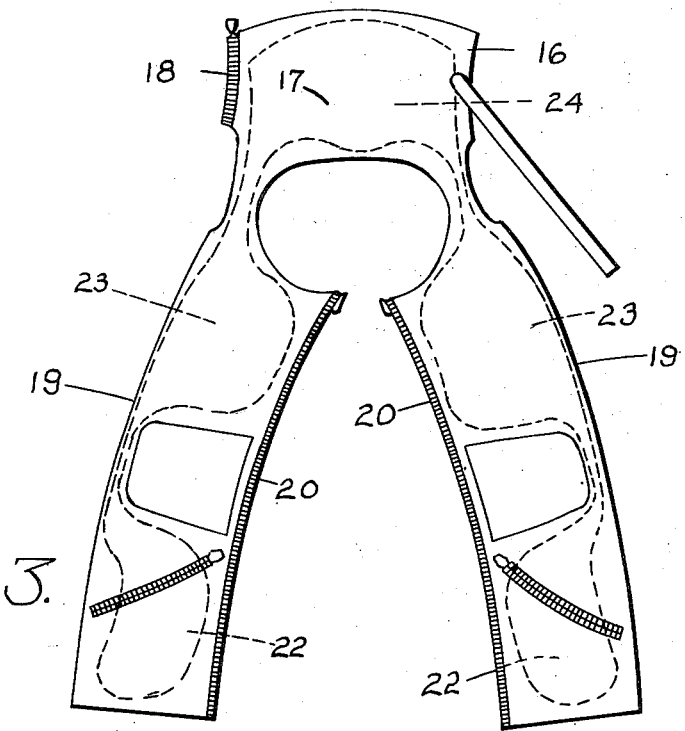
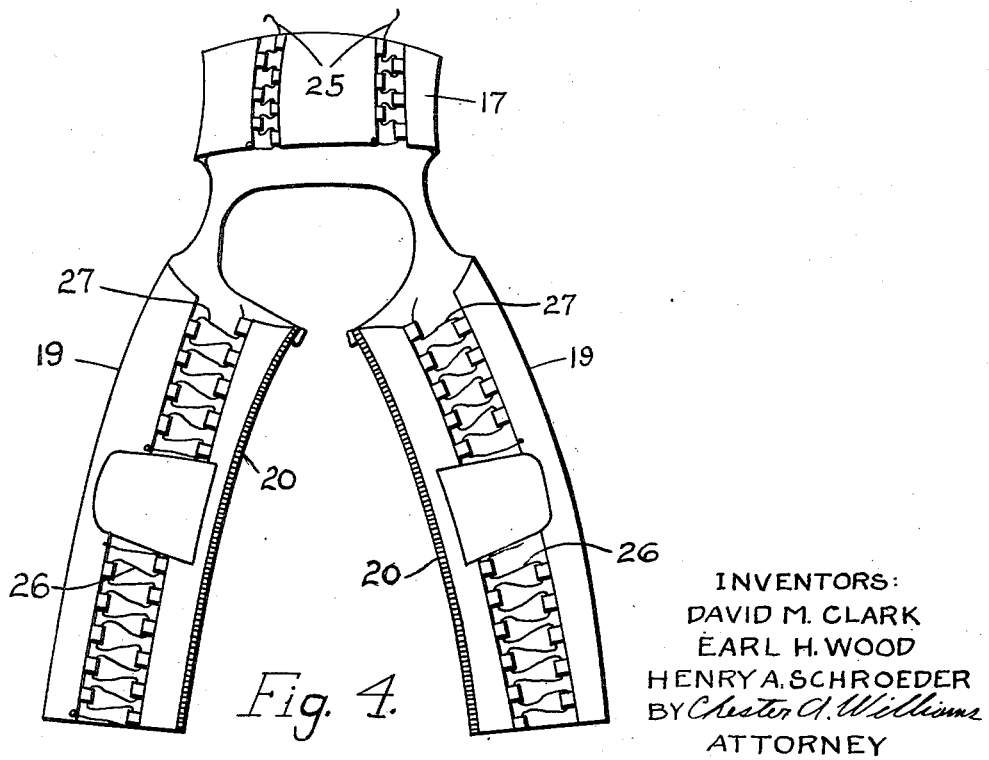
INVENTORS:
DAVID M. CLARK
EARL H. WOOD
HENRY A. SCHROEDER
BY Chester A. Williams
ATTORNEY Patented July 5, 1949

2,475,479

UNITED STATES PATENT OFFICE 2,475,479

GARMENT OR ATTACHMENT FOR CONTROLLING THE DISTRIBUTION, PRESSURE, AND CIRCULATION OF BODY FLUIDS

David M. Clark, Worcester, Mass., Earl H. Wood, Rochester, Minn., and Henry A. Schroeder, Chesterfield, Mo., said Wood and said Schroeder assignors to said Clark Application September 26, 1946, Serial No. 699,378

3 Claims. (Cl. 128—1)

The present invention relates to an improved garment, or attachment for controlling the distribution and pressure of body fluids and thereby enable the occupant of an aircraft to withstand the abnormal forces to which his body may be subjected as a result of rapid and extreme changes in the aircraft's speed and direction of flight.

Experience has shown that maneuvers of fast and high powered aircraft create centrifugal forces which are frequently great enough to render the occupants temporarily blind and sometimes unconscious. These forces act upon the body fluids, particularly blood, and the tissues of the body, so that when a fast airplane is banked and turned, or dived and then leveled off, these body fluids are driven down, away from the head by reason of their increased weight. The resulting reduction or stoppage of blood circulation to the head, if of sufficient magnitude and duration causes a dimming or complete loss of vision, known as "blackout," and if the force is great enough and is sustained long enough, complete unconsciousness may result. Since the forces discussed above increase in proportion to the square of the velocity of the airplane and in inverse proportion to the radius of the turn, the maneuvering of fast aircraft is definitely limited by the ability of the pilot and other occupants to withstand the forces that cause the above described severe physiological changes with the body. The object of the present invention is to provide an improved garment or attachment, for occupants of fast aircraft which will so control the distribution, pressure and circulation of body fluids as to enable the wearer to successfully withstand abnormal forces created by rapid and extreme changes in the speed and direction of the aircraft's flight. As will later appear, the garment of the present invention is particularly characterized by the completeness of the protection afforded the wearer and its simplicity and lightness in weight; furthermore it may be used for medical treatments.

Briefly stated, the device of the present invention consists of a closely fitted suit in the form of a coverall, or an attachment to be worn over ordinary clothing, having incorporated therein a unitary bladder, which is adapted to be inflated so as to simultaneously apply pressure on the abdomen, the thighs and the legs of the wearer. The inflated bladder portions are adapted to compress the associated body areas, and restrict the flow of body fluids to the dependent portions of body when the wearer of the garment is subjected to the abnormal forces discussed above, resulting from the rapid and extreme changes in the speed and the direction of flight of an airplane. By reason of the above noted provision of the bladder portions at critical points in the vascular system of the body, the garment is also adapted for extremely high altitude flying, so as to pressurize the body and provide considerable protection to the wearer from the disturbing physiological effects of extremely high altitudes.

In the above and other respects, the devices of the present application present certain features in common with the garment, or attachment, shown and described in the pending application of David M. Clark and Earl H. Wood filed Sept. 14, 1946, Serial No. 697,118. Other and further objects and advantages of our invention will be apparent from the following description thereof considered in connection with the accompanying drawings in which—

Fig. 3 is a view in front elevation of a protective attachment embodying the present invention in a form to be worn over ordinary clothing.

Fig. 4 is a view in rear elevation of the attachment shown in Fig. 3.

Figure 1:
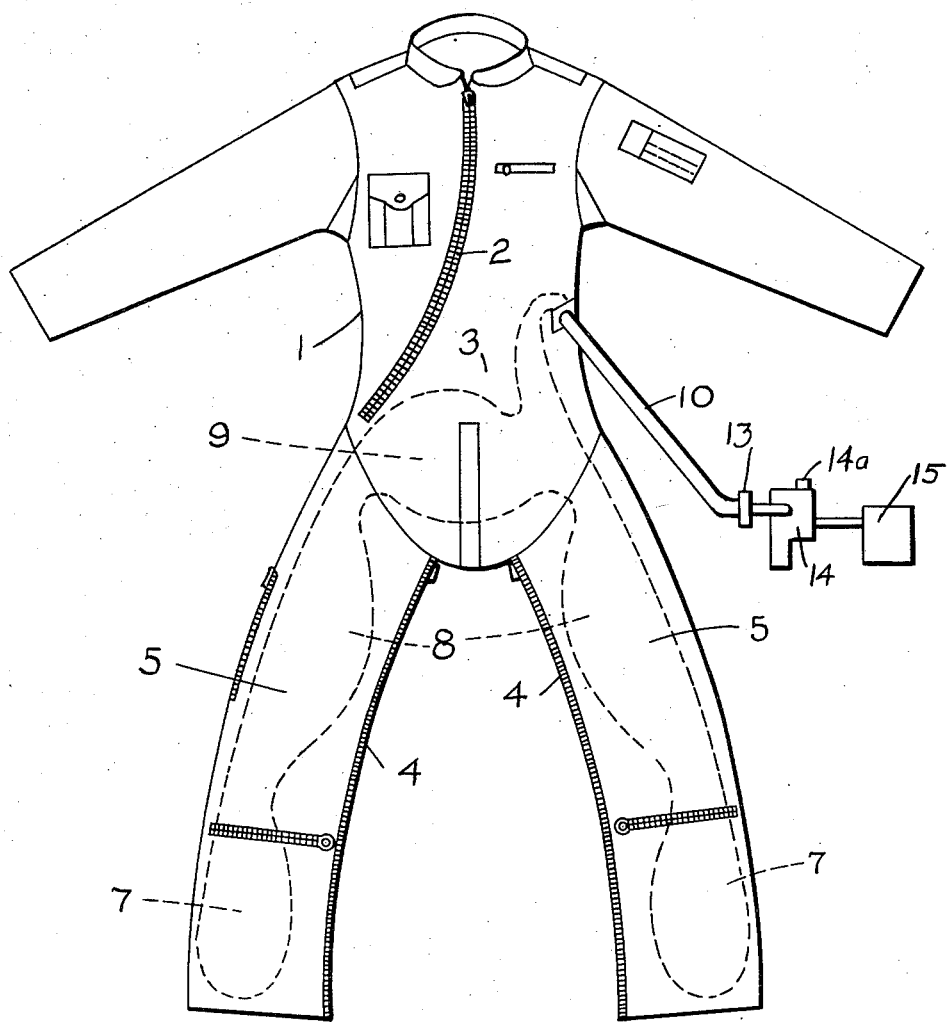
Fig. 1 is a view in front elevation of the outside appearance of a protective garment embodying the present invention.
Figure 2:
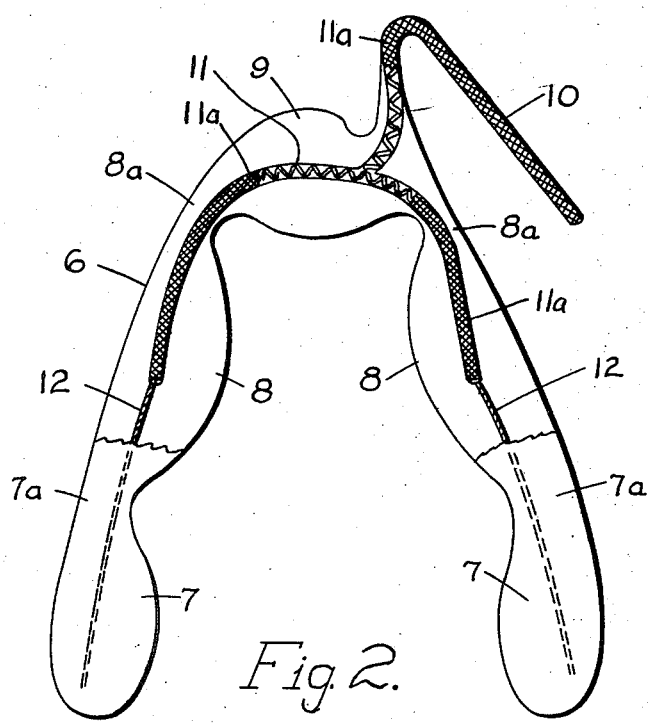
Fig. 2 illustrates the construction of a unitary bladder for the garment of Fig. 1, with certain portions broken away.

Referring first to Figs. 1 and 2, the invention is shown, for purposes of illustration, as being embodied in a garment made as a complete coverall suit 1 having a fastener 2 of the slide type extending across the front of the body portion 3, with other slide fasteners 4 being provided in the leg portions 5 to permit convenient donning of the suit. The material of the body portion 3 and leg portions 5 provides suitable pockets for insertion of a unitary bladder 6 which is shown removed from the suit in Fig. 2.

The bladder 6 is composed of any suitable material such as rubber, or treated fabric which will hold air under pressure, and is so formed that when placed in the suit 1 and inflated, the bladder will apply pressure to the calves, and thighs and over the abdominal area of the wearer. In order to obtain these results, the bladder 6 provides enlarged portions 7 and 8 extending downwardly on either side of a central portion 9, with reduced necks 7a and 8a therebetween, and the location of these portions within the suit 1 is indicated in dotted lines in Fig. 1. With the arrangement shown, it is obvious that inflation of the bladder 6 will result in the application of pressure to the calves by the bladder portions 7, to the highs by the bladder portions 8, and over the abdominal area by portion 9.

The bladder 6 is adapted to be inflated by the admission of a fluid pressure medium, such as air, through a tube 10 leading from the top of the abdominal portion 9. In order to insure that all portions of the bladder will be simultaneously inflated upon the admission of air under pressure through the tube 10, means are provided for holding opposite halves of the bladder away from each other when the bladder is in a deflated condition. For this purpose a light weight coil spring 11 is located in the middle of the abdominal portion 9, with the spring 11 extending into thigh portions 8. Beyond the ends of the spring 11, flexible cords 12 extend into the calf portions 7, so that the opposite sides of the bladder 6 which are flat are always held out of engagement with each other even when the bladder is deflated. In order to prevent sharp bending of the tube 10, the spring 11 extends into the tube to hold it outwardly from the bladder. The spring 11 is preferably covered with a light netting 11a to prevent chaffing of the bladder.

The tube 10 leading from the bladder 6 is connected by a suitable coupling 13 to a control valve 14 which is adapted to regulate the amount of pressure admitted to the bladder 6 in proportion to the centrifugal, or other abnormal forces, to which the wearer of the suit is subjected as a result of sudden and extreme changes in the speed and direction of flight of the aircraft. The specific construction of the control valve 14 forms no part of the present invention, and it is sufficient for an understanding of the functioning of the bladder 6 to state that the valve 14 operates automatically to control the admission of air under pressure from a pressure source 15, in response to the creation of abnormal forces. For purposes of illustration, the valve 13 is indicated as being of the type shown and described in the pending application of David M. Clark and Henry W. Wilder filed July 12, 1946, Serial No. 683,098, for a protective system for aircraft occupants wherein a weight 14a is responsive to forces developed during flight to automatically operate the valve and control the admission of air under a predetermined pressure to the bladder 6.

When the valve 14 operates, as described above, air from the pressure source 15 is admitted to the tube 10 from which it enters the bladder 6 to inflate all portions thereof almost simultaneously owing to the unitary construction of the bladder and the fact that opposite sides of the bladder are held out of engagement with each other by the spring 11 and the cords 12. With the bladder 6 so inflated, the associated portions of the suit 1 serve to apply the inflated bladder portions 7, 8, and 9 to the calves and thighs, and over the abdominal area of the wearer. As a result, the distribution and pressure of the body fluids, particularly blood, is controlled in such manner as to enable the wearer of the suit to withstand the abnormal forces to which his body is subjected as a result of rapid and extreme changes in the speed and direction of flight of which, if not compensated for would produce a reduction or stoppage of the blood supply to the head. When the airplane returns to normal flight, the control valve 14 automatically functions to release the pressure in the bladder 6 and the bladder resumes its normal deflated condition.

Figure 5:
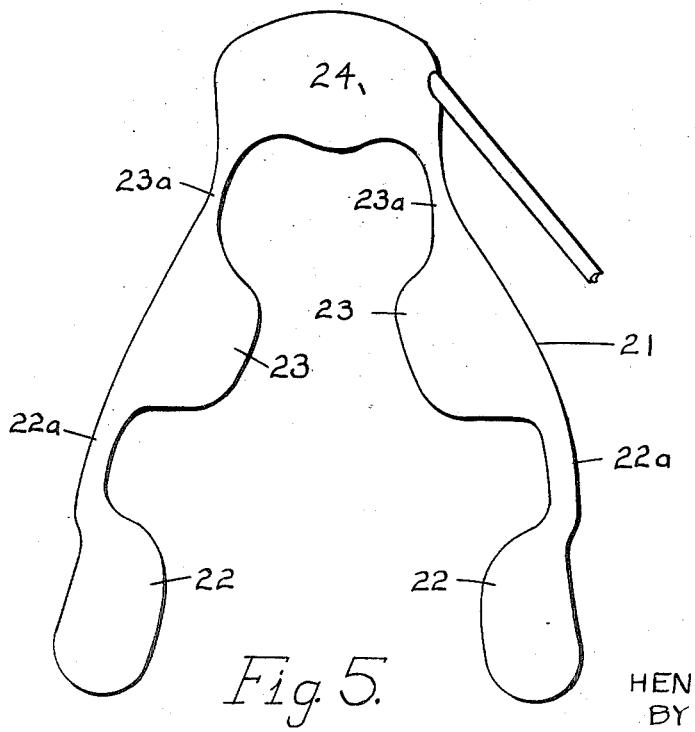
Fig. 5 illustrates the construction of a unitary bladder for the attachment shown in Figs. 3 and 4.

Referring now to Figs. 3 and 4, there is shown a modification of the invention wherein a unitary bladder is embodied in an attachment 16 to be worn over ordinary clothing, with the attachment having a skeleton form with a minimum of material therein just sufficient to hold the bladder in place after the attachment has been donned. As best shown in Fig. 3 the attachment 16 consists of a waist portion 17 having a slide fastener 18 at one side, with cutaway leg portions 19 extending downwardly from the waist portion 17. The leg portions 19 are provided with slide fasteners 20 along their inside edges, so that the whole attachment can be readily donned over ordinary clothing. The material of the portions 17 and 19 provides suitable pockets to receive the unitary bladder 21 which is shown in Fig. 5 as being removed from the attachment.

The bladder 21 is of substantially the same form as the bladder 6 and provides enlarged portions 22 and 23 connected by reduced necks 22a and 23a extending downwardly from each side of a central portion 24. The location of the bladder portions 22, 23 and 24 within the attachment is indicated in dotted lines in Fig. 3, from which it is apparent that the continuous portions of the attachment 16 are so designed as to apply the bladder portions 22, 23, and 24 to the calves, thighs, and abdominal area of the wearer, when the bladder 21 is inflated.

In order to provide for proper application of the bladder portions 22, 23 and 24 to the body of the wearer, the waist portion 17 and the leg portions 19 of the attachment 16 are provided with means for adjusting the girth of these portions. As best shown in Fig. 4, which is a rear view of the attachment of Fig. 3, the waist portion 17 is provided with lacings 25 at either side, at the rear of the pocket which holds bladder portion 24 while each leg portion 19 is provided with separate lacings 26 and 27 opposite to the pockets which hold the bladder portions 22 and 23, respectively. The lacings 25, 26, and 27 therefore, provide means whereby the attachment 17 can be readily adjusted by the wearer to properly apply the bladder portions 22, 23, and 24 in accordance with the amount of outside clothing that is being worn.

From the foregoing, it is apparent that by the present invention, there is provided an improved garment or attachment for preventing an unnatural distribution of fluids within a human body which is subjected to abnormal forces set up when the body is accelerated in space, as when in an aircraft. Furthermore, by reason of the inherent capabilities of the device for maintaining a substantially natural distribution of fluids within a human body which is subjected to fluid circulation-distributing forces of any sort, our garment or attachment may also be very effectively employed by hospitals and clinics for the treatment of patients who are suffering from various maladies effecting the human vascular system. When so employed for purely medical purposes, the garment is effective to either maintain a normal distribution of body fluids, or to actually increase a patient's blood pressure. It has been found that the massaging effect of the applied bladders produces very beneficial results on patients suffering from certain of the above noted maladies.

We claim:

1. A garment of the type described, comprising, a body-encircling section, a pair of leg-encircling sections depending from said body-encircling section, a substantially U-shaped unitary inflatable bladder having each limb thereof associated with a respective one of said depending leg sections and having the base portion thereof associated with said body-encircling section, an air-supply tube connected with the base portion of said bladder, and a coil spring connected with said air-supply tube and extending into each of said bladder limbs for facilitating the entry of air into said limbs.

2. A garment of the type described, comprising, a waist-encircling band including front and back panels secured together at one side of said garment, slide fastener means associated with said front and back panels at the other side of said garment for opening and closing said band, a pair of leg-encircling sections of which each includes a front and a back panel secured together along an outside edge of said garment, slide fastener means associated with the inner edge portions of said leg panels for opening and closing the same, a relatively narrow strip of material connecting the outer top edge portion of each of said front leg panels with the front panel of said waist-encircling band, a substantially U-shaped inflatable bladder unit having its base portion associated with the front panel of said waist-encircling band and having each of its limb portions associated with a respective one of said front leg panels, and a tube connected with the base of said bladder for connecting the latter with a source of fluid supply.

3. A garment of the type described, comprising, a waist-encircling band including front and back panels secured together at one side of said garment with a bladder pocket formed within the front panel, slide fastener means associated with said front and back panels at the other side of said garment for opening and closing said band, a pair of leg-encircling sections of which each includes a front and back panel secured together along an outside edge of said garment and each front leg panel providing a bladder pocket longitudinally thereof, slide fastener means means associated with the inner edge portions of said leg panels for opening and closing the same, a relatively narrow strip of material connecting the outer top edge portion of each of said front leg panels with the front panel of said waist-encircling band, a substantially U-shaped inflatable bladder unit having its base portion disposed within the bladder pocket of said waist-encircling band, and having each of its limb portions disposed within a respective one of the leg pockets, an air-supply tube connected with the base portion of said bladder, and means connected to said air-supply tube and extending into each of said bladder limbs for facilitating the entry of air into said limbs.

DAVID M. CLARK.
EARL H. WOOD.
HENRY A. SCHROEDER.

REFERENCES CITED

The following references are of record in the file of this patent:

UNITED STATES PATENTS

| Number | Name | Date |
|---|---|---|
| 1,878,474 | Drager et al. | Sept. 20, 1932 |
| 2,397,709 | Versoy et al., II | Apr. 2, 1946 |
| 2,397,710 | Versoy et al., I | Apr. 2, 1946 |